March 23, 1971    F. PIGISCH    3,572,212
CONTROL DEVICE FOR HYDRAULIC VENTILATOR DRIVES
Filed March 12, 1969    4 Sheets-Sheet 1
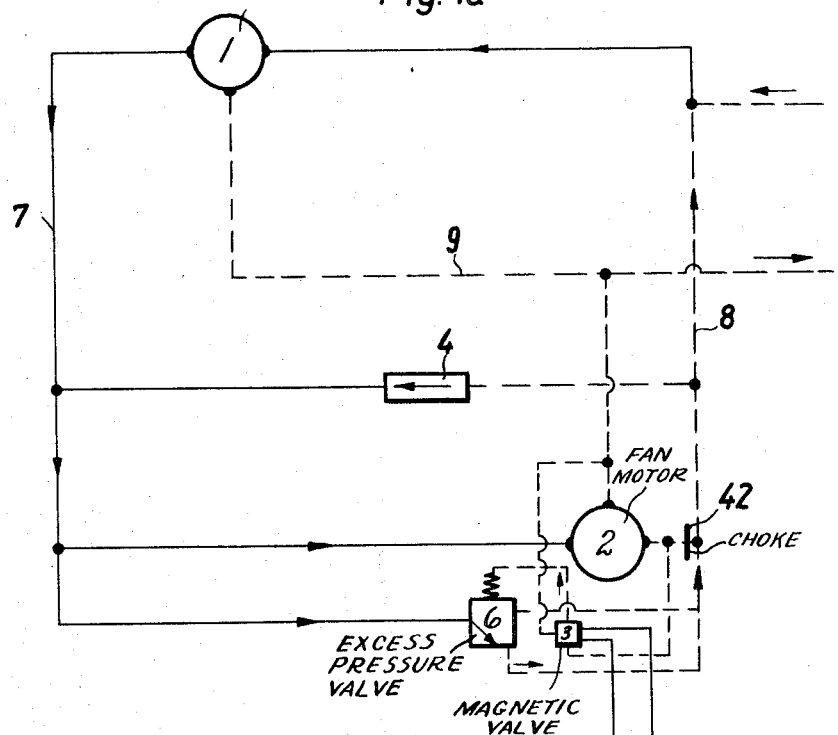
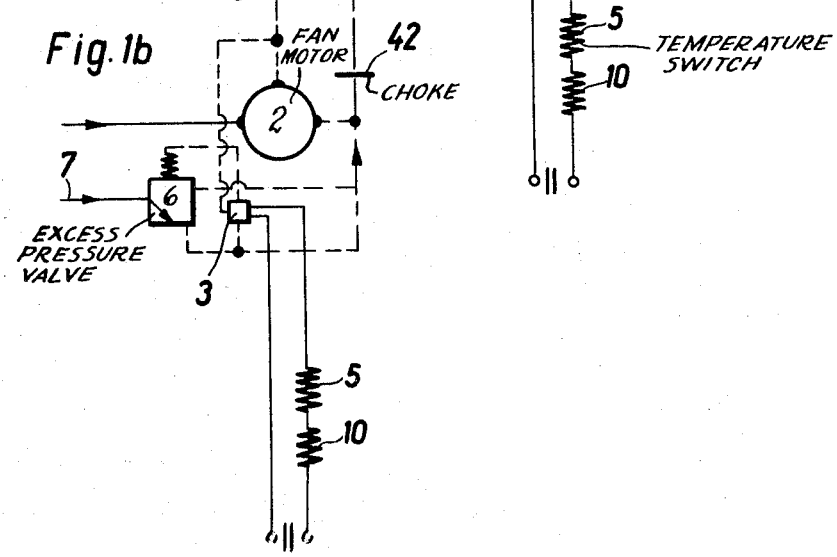
INVENTOR
FRANZ PIGISCH
BY Robert E. Jacob

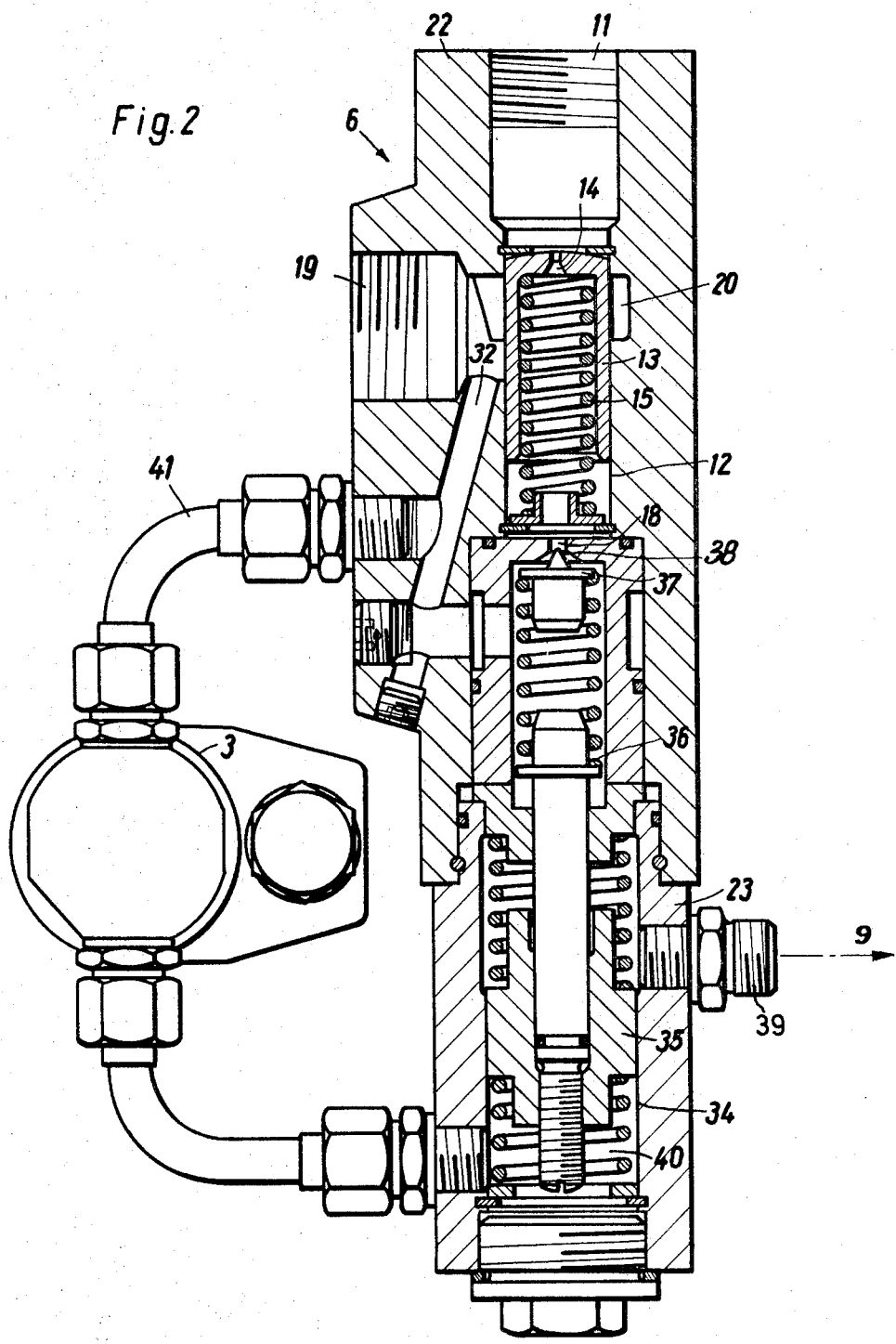

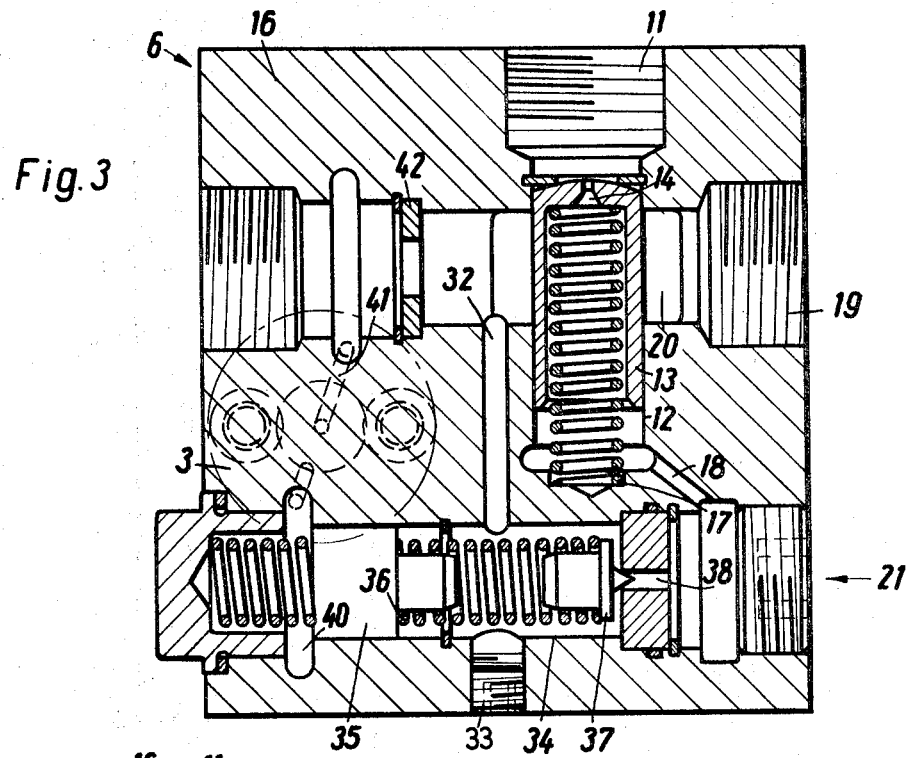
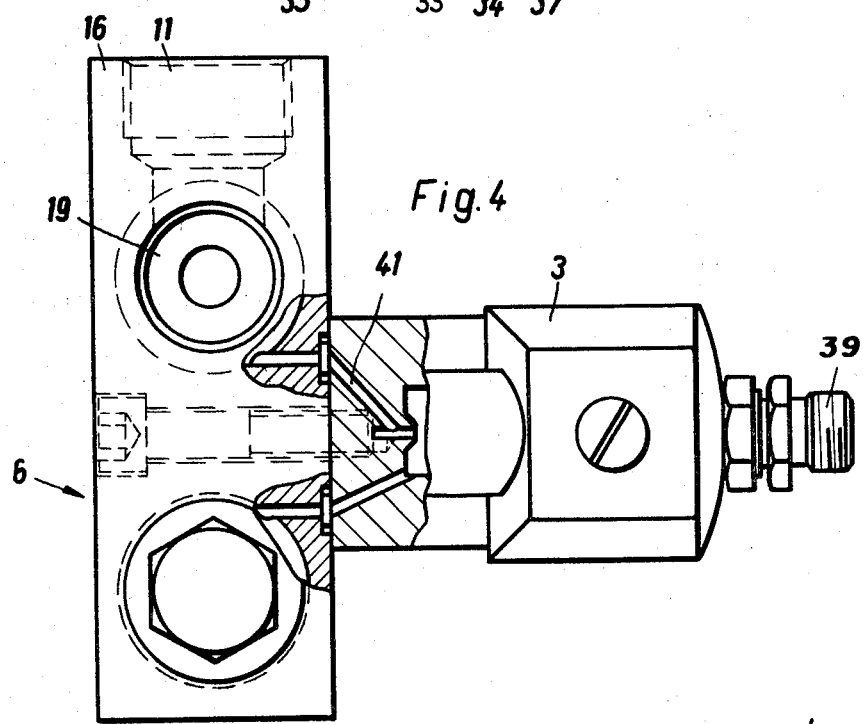

United States Patent Office 3,572,212
Patented Mar. 23, 1971

3,572,212
CONTROL DEVICE FOR HYDRAULIC
VENTILATOR DRIVES
Franz Pigisch, Schockingen, Germany, assignor to Firma Suddeutsche Kuhlerfabrik Fr. Behr, Stuttgart-Feuerbach, Germany
Filed Mar. 12, 1969, Ser. No. 806,463
Claims priority, application Germany, Mar. 13, 1968,
P 16 78 603.1
Int. Cl. F15b 21/04
U.S. Cl. 91—419
9 Claims

ABSTRACT OF THE DISCLOSURE

A control means for hydraulic ventilator drives especially for regulating the temperature of the cooling fluid by means of a controlled ventilator regulator and an excess pressure valve and means for automatically changing the pressure at which the excess valve responds to the back pressure in the operating fluid circuit that depends on the speed or rate of travel, which means is primarily intended for ventilators in branch circuits and includes a valve arrangement, such as magnetic valve means for optionally connecting or disconnecting the back pressure.

BACKGROUND OF THE INVENTION

The invention relates to a control device for hydraulic ventilator drives, particularly for controlling the temperature of the cooling agent in vehicles, including a controlled ventilator regulator and an excess pressure valve and provided with means for the automatic change of the response pressure of the excess pressure valve as determined by the back pressure in the circuit of the operating fluid which is dependent on the speed particularly for ventilators in a branch circuit.

It has already been proposed to provide in such a control device means for the automatic change of the response pressure of the excess pressure valve in dependent relationship to the back pressure in the circuit of the operating fluid that depends on the speed or number or rotations. These means are defined by a pre-control valve in the excess pressure valve and a pilot valve connected with a thermostatically controlled ventilator control.

SUMMARY OF THE INVENTION

It is the object of the present invention to simplify such a speed and thermally controlled pressure limiting valve and to adapt it for other possibilities of use, particularly in branch circuits.

Particularly for the control of a branch circuit cooler, for example a charging air cooler, oil cooler or the like, additional operating conditions must be observed. In particular the cutting in of a branch circuit ventilator or fan depends essentially from the ambient temperature and also from the rate of travel at any time. The present invention therefore is intended to solve the problem of constructing the auxiliary or branch circuit ventilator for optional switching operation.

This problem is essentially solved in that in a control device of the type described above, a valve arrangement is provided for optionally turning the back pressure on and off.

A particularly advantageous embodiment is obtained if an electro-magnetic valve is employed and if for operating the valve a temperature switch and a load stage switch are provided.

In a modified embodiment of the invention the engine lubricating oil is utilized in lieu of a separate oil container for the circulation of the operating fluid.

Thus, in accordance with the invention it is possible in a valve the control of which depends upon the speed, to optionally cut in or disconnect by way of a magnetic valve the back pressure that depends on the speed. The control device in accordance with the invention may be used either for the branch circuit alone or also in combination with the control device in accordance with the older proposal for main and branch circuit operation.

The control device in accordance with the invention employs instead of a continuous inclusion or operation of the ventilator which in accordance with the older proposal is effected by means of a thermostatically controlled valve, an intermittent operation such as is suitable particularly for ventilators or fans for the direct cooling of the charging air and an air cooled charging air cooler.

In a modified embodiment a piston arrangement that is biased by a spring means serves as the valve arrangement against which the back pressure acts. It is particularly suitable if a choke is introduced in the conduit portion between the back flow connection and the piston arrangement.

BRIEF DESCRIPTION OF THE DRAWINGS

Further features and advantages of the invention will become apparent from the following specification with reference to the drawings that show different embodiments and in which:

FIG. 1a shows schematically a circuit for the operating fluid of a cooling installation including the control arrangement in accordance with the invention;

FIG. 1b is a modified embodiment;

FIG. 2 shows a longitudinal section through a first embodiment;

FIG. 3 shows a longitudinal section through a second embodiment;

FIG. 4 is a side view of the embodiment in accordance with FIG. 3 taken in the direction of the arrow 21;

DESCRIPTION OF THE INVENTION

Figure 5:
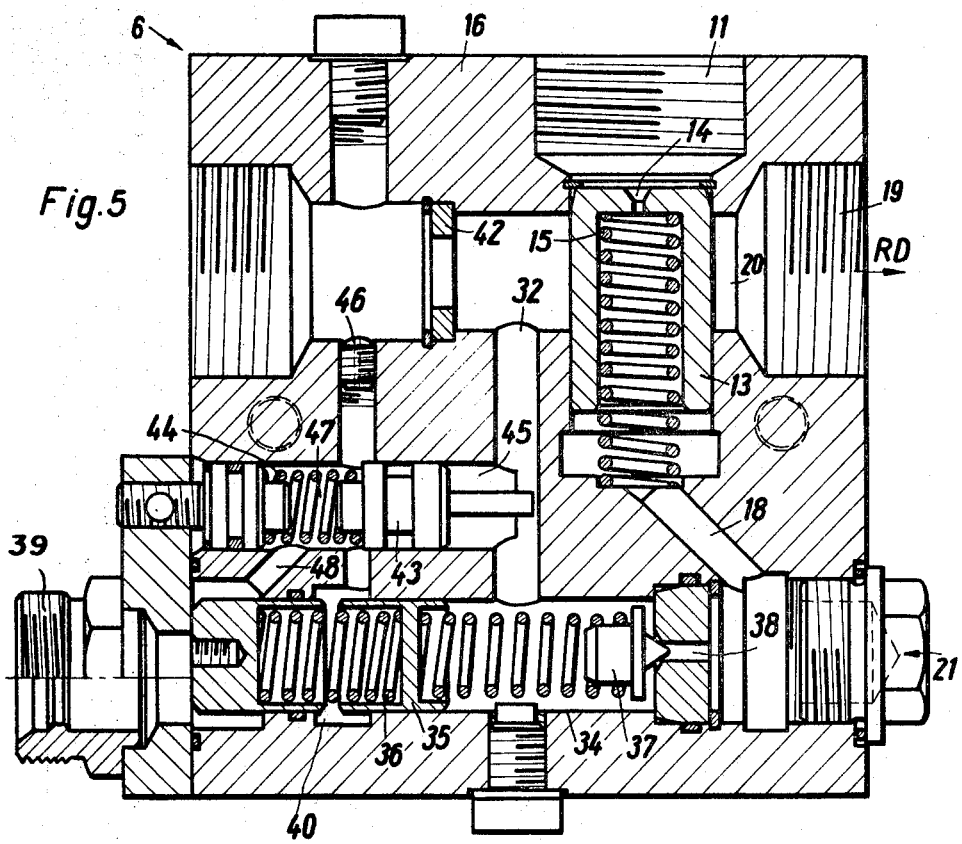
FIG. 5 is a modified embodiment.

In the circuit of the operating fluid with the control device in accordance with the invention as shown in FIG. 1a or 1b, an operating fluid pump 1, a ventilator or fan motor 2 and a valve 3 are provided. Hydraulic fluid may be used as the operating agent which is disposed in a fluid container (not illustrated) in a return flow conduit 8. In the system in accordance with FIGS. 1a and 1b a modified embodiment is illustrated where the lubricating oil of the vehicle serves as the operating agent. Between the forward flow conduit 7 and a return flow conduit 8 a check valve 4 may suitably be provided. Between the forward flow conduit 7 and the return flow conduit 8 a speed controlled excess pressure valve 6 is arranged. For cutting in and disconnecting the back pressure a valve 3 is provided which is controlled by a temperature switch 5 and a load or rate of travel switch 10.

The embodiments in accordance with FIGS. 1a and 1b differ essentially merely by the location of the installation of a choke baffle 42.

Due to the oil flowing from the fan motor 2 into the return flow conduit 8 a back pressure builds up which is reinforced by the choke 42 and which acts by way of conduit part 41 and the open magnet valve 3 against the back side of the piston device 35 in the space 40. This piston is pushed upwardly due to the back pressure and tensions the spring means 36. By virtue of this tension the pilot valve 37 is pressed against the valve seat 38 so that no oil can flow off through choke 14 of piston 13. Consequently, no differential pressure is developed between the front and the rear of the piston, so that the piston 13 is pressed by the spring 15 until it engages the spring ring and thus prevents direct overflow of the high pressure oil into the back flow.

In the first embodiment of a control device in accordance with FIG. 2 the excess pressure valve 6 is disposed in a housing 22. This comprises a high pressure connection 11 which is in communication with a cylindrical bore 12 in the housing, a piston 13 displaceable in the bore 12 having a choke bore 14 where the piston 13 operates against a spring arrangement 15. The lower part of the housing bore is in communication with the control valve by way of a connecting conduit 18. Furthermore a back flow connection 19 is provided that leads into an annular space 20. This annular space 20 is provided in the upper region of the bore 12. The supply flow from the high pressure connection 11 to the back flow connection 19 is controlled by displacement of the piston 13.

A leakage oil connection 39 leads by way of a leakage oil conduit 9 to the operating agent or lubricant oil circuit. A leakage oil connection of the motor 2 as well as a leakage oil connection of the pump 1 are connected to this leakage oil conduit 9 in a suitable manner as diagrammatically indicated by dotted lines in FIG. 1a.

A bore 34 in a housing 23 is connected in axial direction to the excess pressure valve 6. In this bore 34 a piston 35 is arranged for displacement against the effect of the spring 36. The spring 36 is supported at the other end against a pilot valve 37 which controls a through-passage to the conduit 18 of the pressure limiting valve 6.

The annular space 20 of the excess pressure valve 6 is in communication with a pressure space 40 of the control valve by way of a conduit 41. In the conduit 41 a magnetically controlled two way or three way valve is arranged. This form of construction makes it possible to locate the magnetic valve at any desirable suitable location of the vehicle.

In the embodiment in accordance with FIG. 2, the pressure condition for an associated ventilator is illustrated, i.e., the connection between high pressure connection 11 and the back pressure connection 19 is interrupted by the piston 13, so that the total quantity of pressure oil flows by way of fan motor 2. However, the oil flowing from the fan motor into the return flow conduit 8 causes the build up of a back pressure, that acts by way of conduit parts 32, 41 and the open magnet valve 3 against the back side of the piston components 35 in the space 40. This piston is displaced upwardly by the back pressure and biases the spring arrangement 36. As a result of this biasing the pilot valve is pressed against the valve seat 38, so that no oil can flow off through the choke 14 of piston 13. As a consequence no differential pressure is developed between the front and the back side of the piston, i.e., the piston 13 is pressed by the spring 15 against the abutment of the resilient ring and thus interrupts any direct overflow of the high pressure oil into the return flow. Contrary to the valve construction of FIGS. 3 and 4, the leakage oil (gap leakage etc.) collecting in the valve does not flow through the magnetic valve 3, but it flows off by way of the separate leakage oil connection 39.

In the embodiment illustrated in FIGS. 3 and 4, the magnetic valve 3 is built directly onto the housing 16 in the control device. In the back flow conduit from the hydraulic motor a choke baffle 42 is provided. By means of this choke an increase of the back pressure is obtained which acts against the piston 35.

In the embodiment in accordance with FIGS. 3 and 4 the pressure condition in the valve for an associated ventilator or fan is illustrated, i.e., that by means of the connection of the back flow from the motor with the back of the piston 35 the spring means 36 are prestreessed so that the pilot valve 37 prevents the off-flow of high pressure oil into the back flow. Accordingly, no oil can flow through the choke 14. No differential pressure is built up between the front end and the back end of the piston 13, so that the piston 13 is pressed upwardly by the spring arrangement 15 so far that the connection between high pressure side 11 and return pressure flow 19 is interrupted.

When the magnetic valve is closed, i.e., the connection between the annular space 20 and the pressure space 40 is shut, the back flow oil that comes by way of the conduit 41 from the back flow connection 19 into the magnetic valve 3 can flow off by way of the leakage oil connection valve 3 into the leakage oil system. No essential pressure is built up in the space 40 so that the spring arrangement 36 which is supported on the one hand against the piston 35 and on the other hand against the pilot valve 37 is thus also freed of pressure, and therefore the pilot valve 37 is lifted off its seat by the oil reaching the conduit system 18, 38 by way of the choke bore 14. This oil then flows off into the back flow system. Owing to the difference in pressure developed in the choke 14 by the through flow between the front and the rear end of the piston 13, the piston is moved against the spring pressure of the spring arrangement 15 so that between high pressure connection 11 and back flow or back pressure a connection is developed. The oil flows directly into the return flow oil line through connection 19, thus passing around the fan motor 2. If the magnetic valve 3 is actuated to an open position, then the pressure resulting from the quantity of oil flowing in the return flow is built up in the pressure space 40 at the choke 42, the piston 35 is pressed downwardly and biases the spring arrangement 36. The pilot valve 37 closes the conduit 18 so that the oil quantity flowing through the choke 14 is decreased. As a result, the difference in pressure between front and back side of the piston 13 is also decreased so that the cross section between the high pressure and the return flow side is decreased. A pressure is beginning to build up in the high pressure conduit system which causes the fan motor to rotate.

As long as the temperature switch 5 and the load stage switch 10 are not cut in, i.e., they have not opened the magnetic valve 3, the pump 2 conducts operating fluid directly by way of the return flow conduit 8.

The temperature switch 5 opens if, for example, an external temperature of 30° C. prevails and the engine is running at 75% of the full load or full rate velocity. Then also pump 1 operates at this speed and beginning with this speed, the fan for the shunt circuit should also run. With sudden cutting in a high peak pressure would develop in the conduit system because the fan would have to be very rapidly accelerated from zero speed. Then the excess pressure valve 6 would respond but the pressure would continue to increase somewhat because of the inertia of the valve. In order to avoid these switching shocks, the cut in valve is not directly operated by switches 5 or 5 and 10, but indirectly.

At higher external temperatures the charging air, for example, must be cooled independently of the speed or rate of travel. On the other hand, with an external temperature at which air coling would not actually be neces,-sary the charging air would be heated by the charging air blower at a higher rate of travel and then has to be cooled again in relationship to the engine output. In this event the charge stage switch 10 serves for actuating the fan motor 2.

In the embodiment in accordance with FIG. 5 a piston arrangement 43 is provided in lieu of the magnetic valve 3 described above. This piston arrangement 43 is displaced towards the left from the position indicated against the force of the spring arrangement 44, as the back pressure increases, and in paritcular the back pressure RD acts from the back pressure connection 19 by way of conduit parts 32, 45 agains the piston arrangement 43.

Due to this displacement, it is now possible for the pressure building up ahead of the baffle 32 to act by way of a choke 46 against the reverse side of the piston 35 so that the pilot valve 37 closes the conduit portion 38. The further effect is then exactly the same as explained hereinabove with reference to the manner operation of the other embodiments.

While with the first embodiment described the cutting in of the fan was able to take place in response to a temperature magnitude as well as in relation to the rate of travel at the time, the embodiment in accordance with FIG. 5 cuts in only in relation to the back pressure and thus it depends on the pump speed or the motor speed. Since the speed of the motor is a measure of the rate of travel at the time, an automatic cutting in, depending purely on the rate of travel exists in this case.

In the position of the piston 43 illustrated in FIG. 5 the quantity of oil reaching the space 47 from the motor return flow by way of the choke 46 flows without pressure by way of an off flow conduit 48 into the leakage oil connection 33.

Figure 6:
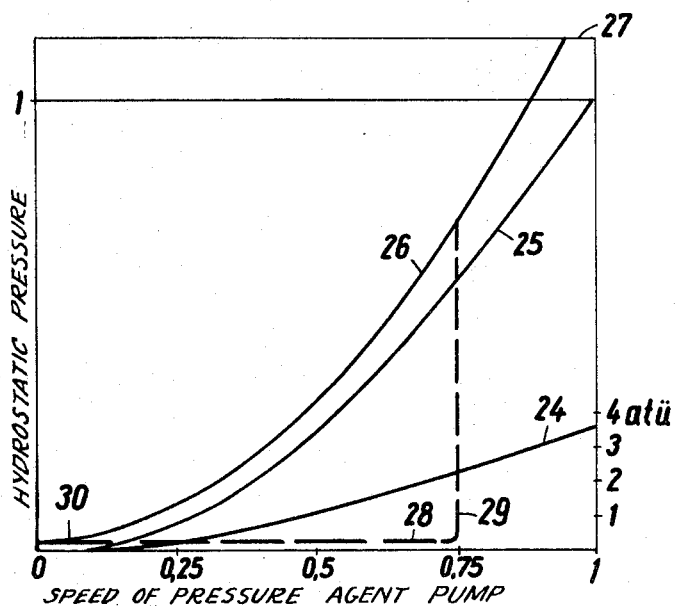
FIG. 6 is a chart of the relationship of speed to hydrostatic pressure.

The diagram in accordance with FIG. 6 shows the relationship between the hydrostatic pressure and the speed of the pressure agent pump. The curve 24 shows the normal course. The curve 25 corresponds to the course at the high pressure side with steady fan operation, i.e., when no acceleration of the fan takes place.

In excess pressure valves known heretofore, the response pressure of the excess pressure valve had to be so chosen in relation to the level line 27 that an excess pressure valve opens only when the prevailing pressure at the moment exceeds the maximum pressure necessary for the highest fan speed. By means of the control device in accordance with this invention, it is accomplished that the response pressure of the excess pressure valve with continually operating magnetic valve follows the curve 26 whose relative distance from the curve 25 remains constant or increases negligibly. The curve portion 30 at low speed corresponds to the spring tension of the speed controlled excess pressure valve. The path of the curves 26 and 30 can be controlled in accordance with suitable choice of the constants of the springs. This makes it possible to adapt the existing pressure differential between the high pressure required for a particular fan speed and the response pressure of the existing pressure valve to the existing conditions.

In the embodiment in accordance with FIG. 2 the pressure corresponding to the speed is cut in immediately, i.e., the fan motor starts up fast. This form of construction is particularly advantageous with compressors that are operated hydrostatically. In starting the compressors require a mixmum torque. The pressure depends here on the speed of the pump.

The curve portions 28 and 29 illustrate the change of pressure as the magnetic valve is operated by the travel rate switch. The pressure first remains constant over a considerable range of the motor speed and then increases very rapidly to the magnitude necessary for operating the fan. If the speed is increased further, the curve 29 merges with the curve 26.

The invention is not limited to the embodiments illustrated and it is not limited to the application in vehicle drive means. What I desire to protect by Letters Patent is set forth in the appended claims.

I claim:

1. Control means for hydraulic ventilator drives, particularly for controlling the temperature of the cooling fluid in vehicles having a fluid motor and a fan driven thereby, a controlled ventilator regulator, a fluid pump, an excess pressure valve, an operating fluid circuit connected to said excess pressure valve and means operative to change the response pressure of said excess pressure valve as determined by the back pressure in the operating fluid circuit which depends on the number of rotations of said fluid pump, especially for ventilators in branch circuit operation, said excess pressure valve being arranged in a housing and control valve means being associated with said excess pressure valve.

2. Control means in accordance with claim 1 where said control valve means are in the form of an electromagnetic valve and including a temperature switch and a rate of travel switch for actuating said electromagnetic valve.

3. Control means in accordance with claim 2 including an annular passage in said excess pressure valve, a pilot valve having a spring-loaded piston, a return flow passage including a choke extending between said annular passage and said pilot valve, where said electromagnetic valve is disposed in said return flow passage.

4. Control means in accordance with claim 3 including a spring supported against said piston and said pilot valve.

5. Control means in accordance with claim 1 where said excess pressure valve has a high pressure side and a return flow piston subjected to high pressure, spring means biasing said piston, a return flow passage, and an annular passage disposed in said return flow passage, said piston controlling the return flow by way of said annular passage.

6. Control means in accordance with claim 5 where said piston is provided with a choke bore.

7. Control means in accordance with claim 6, including a pilot valve associated with said excess pressure valve and a connecting conduit between the back of said return flow piston and said pilot valve.

8. Control means in accordance with claim 2, comprising a spring-loaded valve means defined by a valve piston and a spring in said housing, and fluid passages for applying return flow pressure to said piston.

9. Control means in accordance with claim 8, in which a bore is provided for receiving said valve piston and said spring, and where a return flow connection is disposed in said housing and a choke is disposed between said valve piston and said return flow connection.

References Cited

UNITED STATES PATENTS

| | | | |
|---|---|---|---|
| 2,233,620 | 2/1941 | Meeks | 60—LUB |
| 2,837,285 | 6/1958 | Urban | 60—54 Cooling |
| 3,175,354 | 3/1965 | Firth et al. | 60—53X |
| 3,401,605 | 9/1968 | Born | 60—53 Cooling |

EDGAR W. GEOGHEGAN, Primary Examiner

U.S. Cl. X.R.

91—46; 60—53